United States Patent
Nakamura (10) Patent No.: US 7,515,311 B2
(45) Date of Patent: Apr. 7, 2009

(54) IMAGE SYNTHESIS APPARATUS AND IMAGE SYNTHESIS METHOD

(75) Inventor: Mika Nakamura, Hirakata (JP)

(73) Assignee: Panasonic Corporation, Osaka (JP)

( * ) Notice: Subject to any disclaimer, the term of this patent is extended or adjusted under 35 U.S.C. 154(b) by 603 days.

(21) Appl. No.: 11/247,320

(22) Filed: Oct. 11, 2005

(65) Prior Publication Data

US 2006/0077495 A1  Apr. 13, 2006

(30) Foreign Application Priority Data

Oct. 13, 2004  (JP)  ............... 2004-298694

(51) Int. Cl.
  *H04N 1/387*  (2006.01)
(52) U.S. Cl. .................. 358/450; 382/284; 382/303
(58) Field of Classification Search .............. 358/450, 358/540; 382/284
  See application file for complete search history.

(56) References Cited

U.S. PATENT DOCUMENTS

| | | | | |
|---|---|---|---|---|
| 5,586,246 A | * | 12/1996 | Nobori et al. | ............... 345/502 |
| 6,095,920 A | * | 8/2000 | Sadahiro | ...................... 463/2 |
| 6,424,752 B1 | * | 7/2002 | Katayama et al. | ........... 382/284 |
| 7,098,914 B1 | * | 8/2006 | Katayama et al. | ........... 345/427 |
| 2006/0033753 A1 | * | 2/2006 | Lai | ........................... 345/629 |
| 2008/0278606 A9 | * | 11/2008 | Aleksic et al. | .............. 348/239 |

* cited by examiner

*Primary Examiner*—Mark K Zimmerman
*Assistant Examiner*—Dung D Tran (57) ABSTRACT

An image synthesis apparatus stores a synthesis order in which input images are to be synthesized with each other, and first and second synthesis numbers respectively designating how many of the input images are to be synthesized to generate first and second output images. The image synthesis apparatus synthesizes the plurality of input images with each other sequentially in accordance with the synthesis order, and stores a resultant synthesized image. When the stored synthesized image is the first output image, generated by synthesizing the first synthesis number of input images in accordance with the synthesis order, the first output image is output to an external destination. When the stored synthesized image is the second output image, generated by synthesizing the first output image with the remaining input images in the synthesis order, the stored second output image is output to the external destination.

5 Claims, 12 Drawing Sheets

IMAGE SYNTHESIS APPARATUS AND IMAGE SYNTHESIS METHOD

BACKGROUND OF THE INVENTION

1. Field of the Invention

The present invention relates to an image synthesis apparatus that synthesizes a plurality of images by layering the images to generate a new image. Such a technique of layering images to synthesize them to generate a new image is generally referred to as a "layer synthesis" or an "overlay".

2. Description of the Related Art

Image synthesis apparatuses that synthesize a plurality of images according to layer synthesis to generate a new image exist conventionally.

Here, layer synthesis refers to synthesizing a plurality of images by layering them on each other in a predetermined order. This image synthesis method used, for instance, when superimposing an image or images on a background image.

In a general layer synthesis apparatus, a plurality of images to be used in synthesis (source images) are read in order from a memory, layered one at a time, and a final synthesized image is output to a display monitor (see Japanese patent No. 3380859, for instance).

Take for example a case in which two images (1) and (2) are synthesized to obtain a synthesized image (5). First, the image (1) is read from the memory and stored in a buffer. Next, the image (2) is read from the memory, and synthesized in a synthesis circuit with the image (1) that is stored in the buffer. This generates the synthesized image (5) which, after being stored in the memory, is output to the display monitor.

In a case in which four images (1) to (4) are synthesized to obtain a synthesized image (6), first the image (1) stored in the buffer and the image (2) subsequently read from the memory are synthesized with each other in the synthesis circuit, and a generated synthesized image (1)+(2) is stored in the buffer. Next, the image (3) is read from the memory, and synthesized with the synthesized image (1)+(2) to generate a synthesized image (1)+(2)+(3) which is then stored in the buffer. Finally, the remaining image (4) is read from the memory and synthesized with the synthesized image (1)+(2)+(3) stored in the buffer. This generates the synthesized image (6) which, after being stored in the memory, is output to the display monitor.

However, since this kind of image synthesis apparatus reads each of the plurality of input images that are the source images from the memory and then generates one new image, when two synthesized images are to be generated, the image synthesis apparatus generates the two by performing image synthesis separately for each synthesized image, even if the two synthesized images share common source images.

In other words, taking for instance the aforementioned examples, the synthesized image (5) is composed of source images (1) and (2), and the synthesized image (6) is composed of the source images (1) to (4). Despite the synthesized images (5) and (6) having the source images (1) and (2) in common, the synthesized image (5) is generated by synthesizing the source images (1) and (2) and then output to the memory, while the synthesized image (6) is generated by synthesizing the source images (1), (2), (3) and (4) and then output to the memory.

In this way, a considerable number of memory accesses and layer synthesis processes take place in a conventional image synthesis apparatus because layer synthesis is performed by reading source images one at a time from the memory even if the synthesized images have common source images. In particular, when a relatively large number of synthesized images is to be generated, the image synthesis apparatus incurs a heavy load because the number of memory accesses and the number of times layer synthesis is performed increases correspondingly. This means that a considerable amount of time is taken to generate the two synthesized images.

In view of this problem, the present invention has an object of providing an image synthesis apparatus and method that reduce the load incurred when generating a plurality of synthesized images according to layer synthesis.

SUMMARY OF THE INVENTION

In order to solve the stated problem, the image synthesis apparatus of the present invention is an image synthesis apparatus for synthesizing a plurality of input images with each other to generate a first output image and a second output image, the image synthesis apparatus including: a synthesis order storage unit operable to store a synthesis order designating an order in which the input images are to be synthesized; a synthesis number storage unit operable to store a first synthesis number and a second synthesis number, the first synthesis number designating how many of the input images are to be synthesized to generate the first output image and the second synthesis number designating how many of the input images are to be synthesized to generate the second output image; an image obtaining unit operable to obtain the plurality of input images; a synthesizer operable to synthesize the obtained plurality of input images with each other sequentially in accordance with the synthesis order; a buffer operable to store a synthesized image that results from the synthesis by the synthesizer; and an output control unit operable to control output of the synthesized image stored in the buffer, such that (a) when the stored synthesized image is the first output image, which has been generated by the synthesizer synthesizing a number of the input images equivalent to the first synthesis number in accordance with the synthesis order, the first output image is output to an external destination, and (b) when the synthesized image stored in the buffer is the second output image, which has been generated by the synthesizer synthesizing the first output image with one or more of the plurality of input images subsequent in the synthesis order to the input images used to generate the first output image, a total number of input images synthesized to generate the second output image being equivalent to the second synthesis number, the stored second output image is output to the external destination.

According to the stated structure, when synthesizing a plurality of input images to generate a first image and a second image that has parts in common with the first image, the generated first image is output as well as being stored in a buffer in the image synthesis apparatus, and the second image is generated using the stored first image. Therefore, the number of processes that are duplicated in layer synthesis can be reduced, and, as a result, the load on the image synthesis apparatus can be lightened.

Furthermore, each of the input images may be stored in a different one of memory areas in an external memory, each memory area being designated by a respective address, the image obtaining unit may obtain each input image from the memory area designated by the respective address, and the output control unit may control such that the first output image is output to, in the external memory, a memory area designated by a first predetermined address, and the second output image is output to, in the external memory, a memory area designated by a second predetermined address.

The stated structure eliminates the need, when generating the second output image, to re-obtain input images that have already been obtained once from the memory. As a result, the input images need only be obtained from the external memory once to generate the first output image and the second output image, and therefore the number of memory accesses relating to image generation processing can be reduced. As a result, the load on the image synthesis apparatus can be lightened.

Furthermore, the buffer may have a capacity that is equivalent to a size of the synthesized image generated by the synthesizer.

According to the stated structure, the image synthesis apparatus has a buffer that has a minimal size that is equivalent to the screen size of the synthesized image. This prevents unnecessary increase in the size of the buffer, and improves production costs of the image synthesis apparatus.

Furthermore, the image synthesis apparatus may further include a counter that is connected to the synthesizer, the counter having an initial value of zero and counting up each time the synthesizer synthesizes any one of the input images with any other one of the input images, wherein, when a value shown by the counter matches the first synthesis number, the output control unit controls such that the first output image is output to the external destination, and, when the value shown by the counter matches the second synthesis number, the output control unit controls such that the second output image is output to the external destination.

According to the stated structure, the counting of the synthesis number by the counter enables the image synthesis apparatus to distinguish between generation of the first output image and generation of the second output image.

Furthermore, the image synthesis apparatus may further include a secondary buffer that is equal in capacity to the buffer, wherein, when controlling such that the first output image is output, the output control unit further copies the first output image to the secondary buffer, and the synthesizer performs further synthesis with use of one of (a) the second output image stored in the buffer and (b) the first output image stored in the secondary buffer.

According to the stated structure, the second output image and the first output image are stored in the secondary buffer and the buffer, respectively. Therefore, after generating the second output image, the first output image and the second output image can be used selectively to generate a third output image.

Furthermore, in order to solve the stated problem, the image synthesis method of the present invention is an image synthesis method for synthesizing a plurality of input images with each other to generate a first output image and a second output image, the image synthesis method including the steps of: a synthesis order storage step of storing a synthesis order designating an order in which the input images are to be synthesized; a synthesis number storage step of storing a first synthesis number and a second synthesis number, the first synthesis number designating how many of the input images are to be synthesized to generate the first output image and the second synthesis number designating how many of the input images are to be synthesized to generate the second output image; an image obtaining step of obtaining the plurality of input images; a synthesizing step of synthesizing the obtained plurality of input images with each other sequentially in accordance with the synthesis order; a buffering step of storing a synthesized image that results from the synthesis by the synthesizing step; and an output control step of controlling output of the synthesized image stored in the buffering step, such that (a) when the stored synthesized image is the first output image, which has been generated by the synthesizing step synthesizing a number of the input images equivalent to the first synthesis number in accordance with the synthesis order, the first output image is output to an external destination, and (b) when the synthesized image stored in the buffering step is the second output image, which has been generated by the synthesizing step synthesizing the first output image with one or more of the plurality of input images subsequent in the synthesis order to the input images used to generate the first output image, a total number of input images synthesized to generate the second output image being equivalent to the second synthesis number, the stored second output image is output to the external destination.

According to the stated method, when synthesizing a plurality of input images to generate a first image and a second image that has parts in common with the first image, the generated first image is output as well as being stored in a buffer in the image synthesis apparatus, and the second image is generated using the stored first image. Therefore, the number of processes that are duplicated in layer synthesis can be reduced, and, as a result, the load on the image synthesis apparatus can be lightened.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following describes an embodiment of the present invention with reference to the drawings.

First Embodiment

1. Structure of PDA 100

First, a brief description is given of a PDA (personal digital assistant) 100 in which an image synthesis unit 200 of the present invention is provided.

Figure 1:
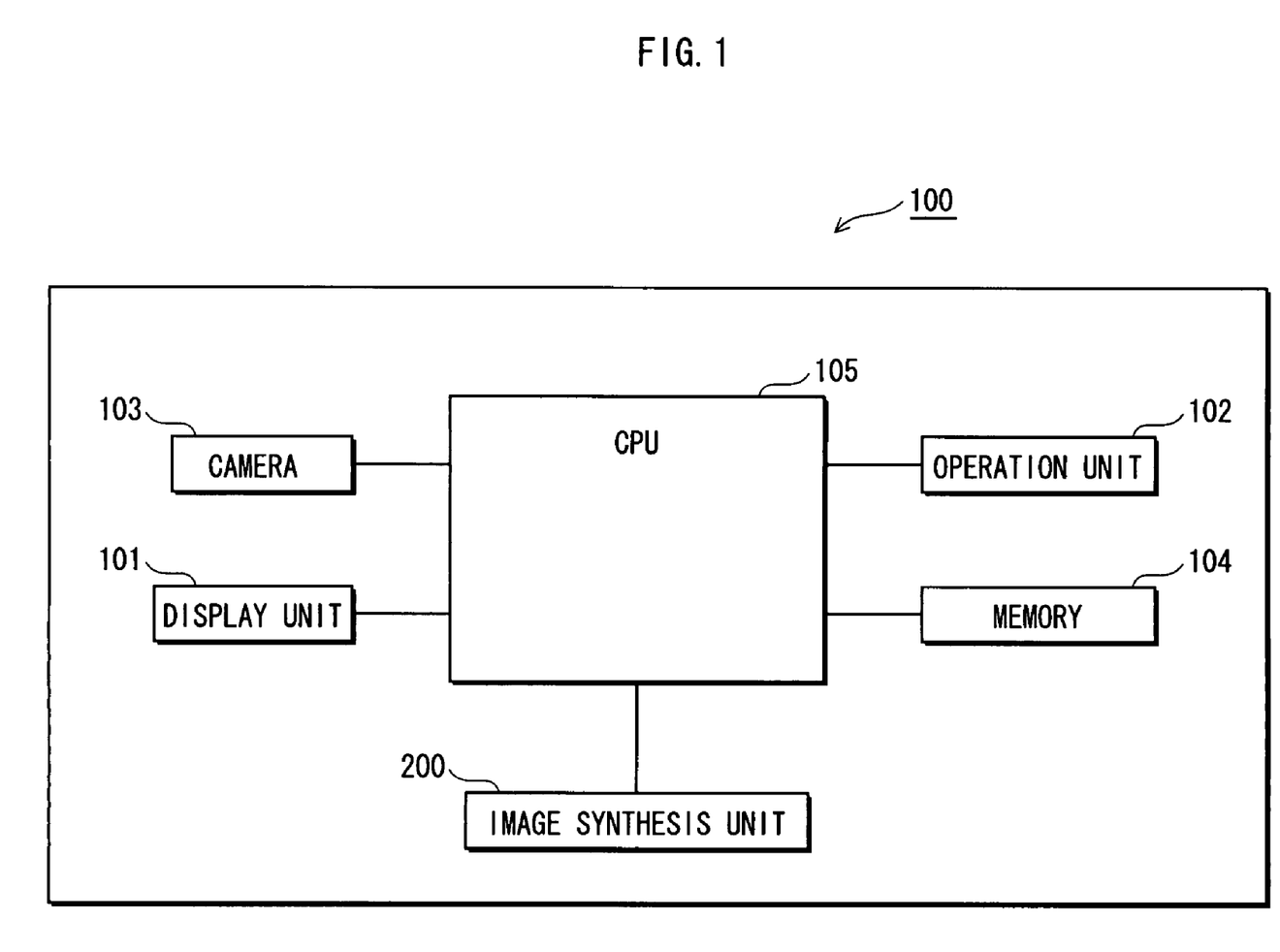
FIG. 1 is a function block diagram showing the structure of a PDA 100 pertaining to a first embodiment of the present embodiment.

As shown in FIG. 1, the PDA 100 has a display unit 101, an operation unit 102, a camera 103, a memory 104, the image synthesis unit 200, and a CPU (central processing unit) 105.

The display unit 101 is a display device composed of an LCD (liquid crystal display) or the like, and has a pixel count of 320 pixels×240 pixels. The display unit 101 has a function of displaying various types of information necessary for the PDA 100 to be used.

The operation unit 102 is an input device that includes a group of depressible keys on which are printed Roman letters, numbers, Chinese characters, or the like, and turnable dial-type keys. A user uses these keys to operate the PDA 100.

The camera 103 is a digital camera whose imaging device is a CCD (charge coupled device), and has a digital zoom function.

The memory 104 is a RAM (random access memory) that has a function of storing various types of information and data necessary for the PDA 100 to be used.

The image synthesis unit 200 has a function of synthesizing a plurality of images to generate a synthesized image. The image synthesis unit 200 is described in detail below.

The CPU 105 has a function of controlling the compositional elements of the PDA 100.

Figure 2:
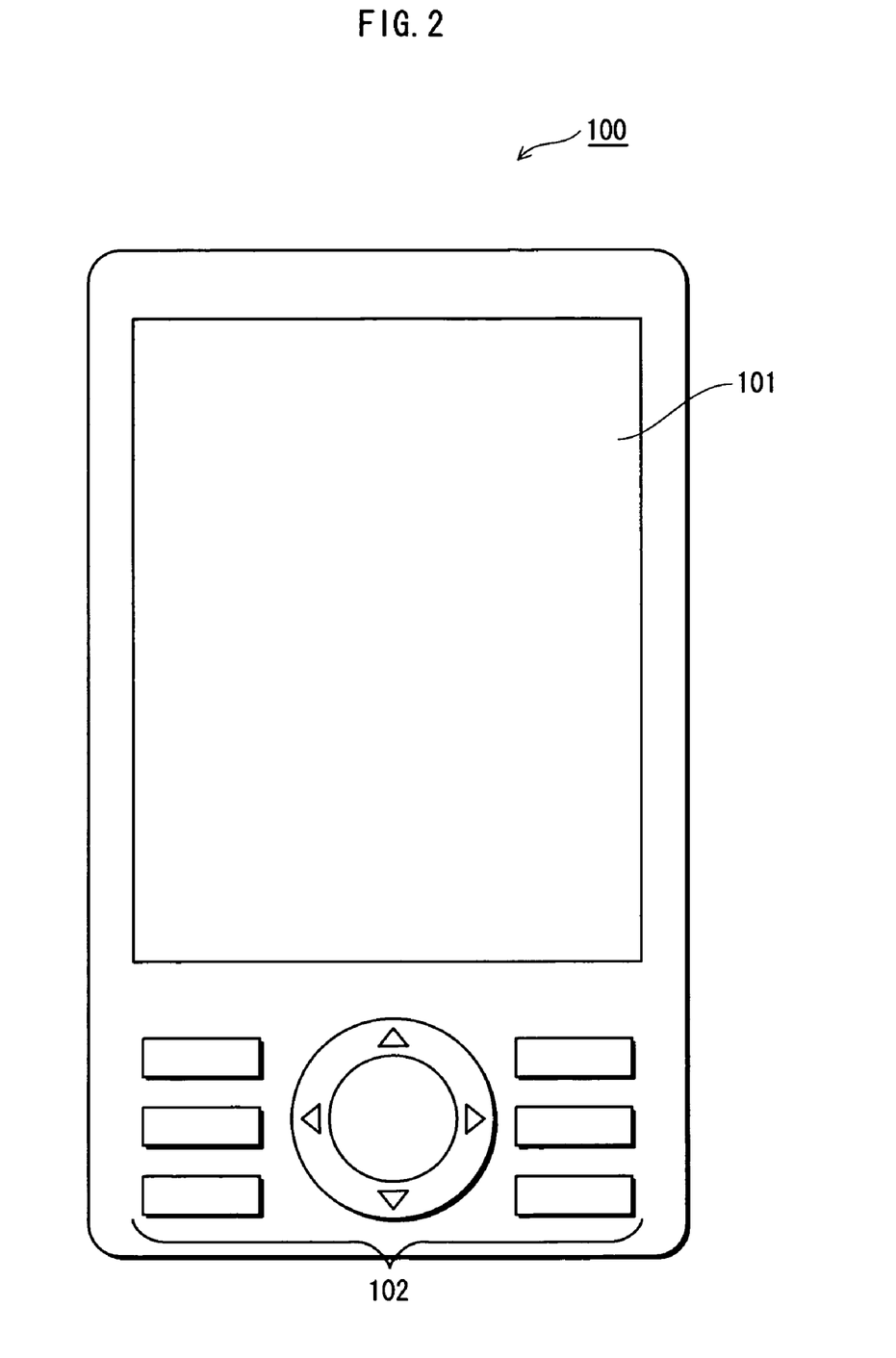
FIG. 2 is a front view of the exterior of the PDA 100.
Figure 3:
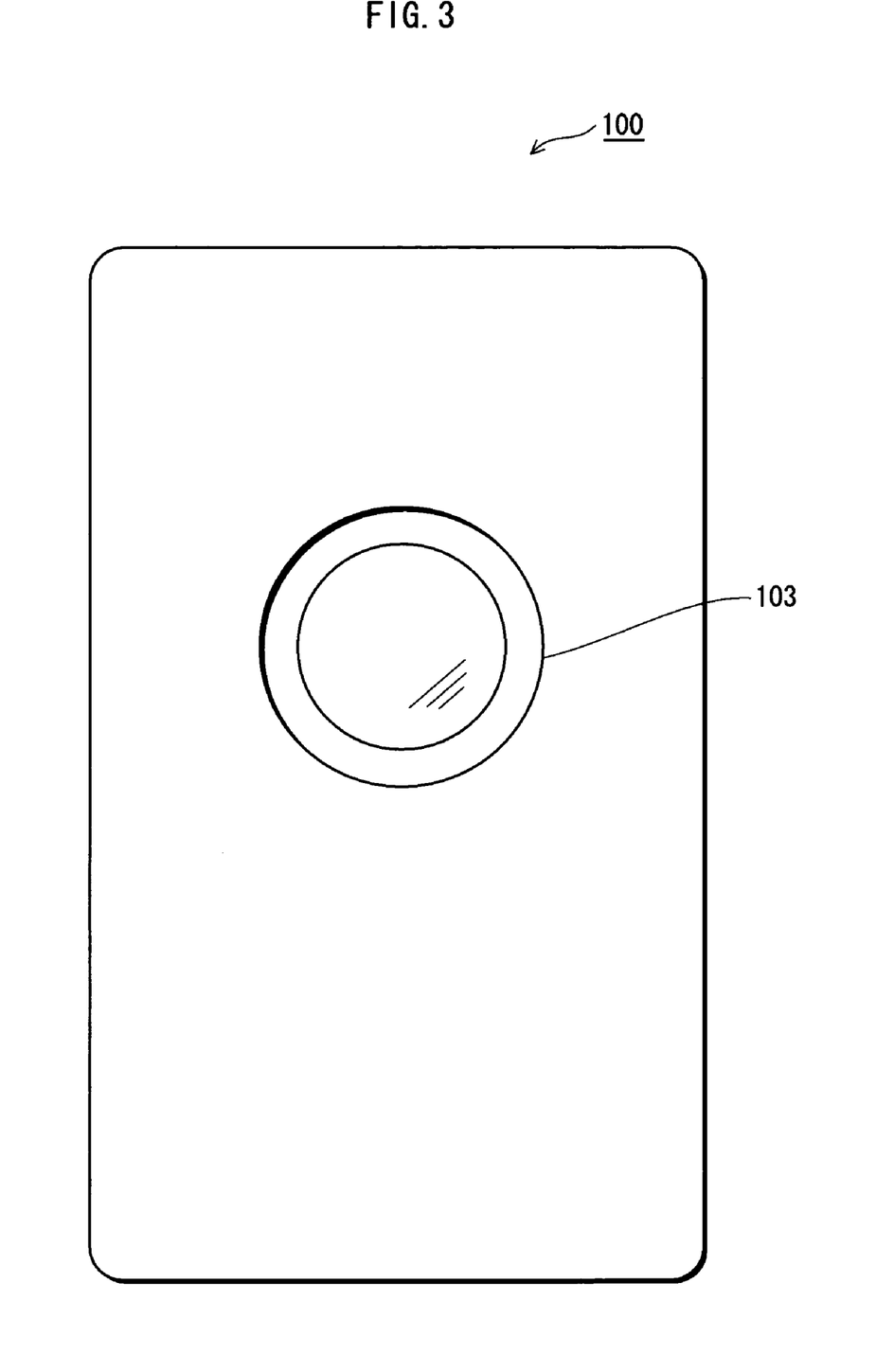
FIG. 3 is a back view of the exterior of the PDA 100.

In the present embodiment, the display unit 101 and the operation unit 102 are on the front surface of the PDA 100 as shown in FIG. 2, and, as shown in FIG. 3, the camera 103 is on the back surface of the PDA 100, which is the opposite surface to the front surface.

According to the stated structure, when the camera 103 photographs a subject such as scenery, an image of the subject is displayed by the display unit 101, and thus able to be viewed.

2. Structure of the Image Synthesis Unit 200

The following describes the structure of the image synthesis unit 200 in detail.

Figure 4:
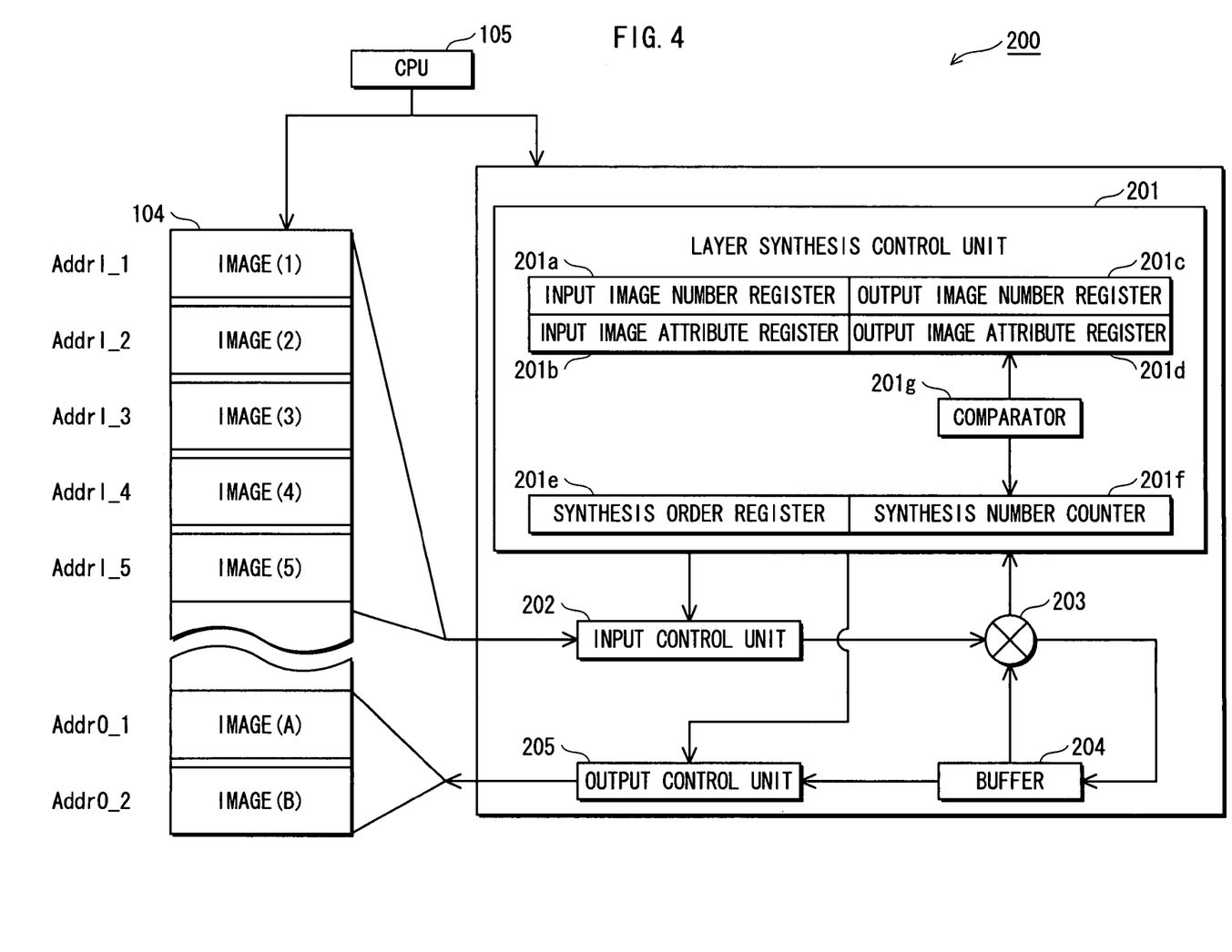
FIG. 4 is a block diagram showing an image synthesis unit 200 provided in the PDA 100.

As shown in FIG. 4, the image synthesis unit 200 has a layer synthesis control unit 201, an input control unit 202, a synthesizer 203, a buffer 204, and a output control unit 205.

The layer synthesis control unit 201 has an input image number register 201a, an input image attribute register 201b, an output image number register 201c, an output image attribute register 201d, a synthesis order register 201e, a synthesis number counter 201f, and a comparator 201g.

The input image number register 201a is a register for storing how many source images (hereinafter called "input images") are to be used to generate a synthesized image.

The input image attribute register 201b is a register for storing respective attributes of a plurality of input images. The attributes of each input image are an address in the memory 104 that is the input source, and the image size.

The output image number register 201c is a register for storing how many synthesized images are to be generated by synthesizing input images and output (herein after called "output images").

The output image attribute register 201d is a register for storing respective attributes of a plurality of output images. The attributes of each output image are an address in the memory 104 that is the output destination, and a number showing how many input images are necessary to generate the output image (hereinafter called a "synthesis number").

The synthesis order register 201e is a register for storing an order in which a plurality of input images are to be synthesized.

The synthesis number counter 201f is a counter that counts up each time a synthesized image is stored in the buffer 204 described below.

The comparator 201g compares the synthesis number stored by the output image attribute register 201d and the count shown by the synthesis number counter 201f.

The input control unit 202 has a function of reading an input image from the memory 104 and transmitting the input image to the synthesizer 203 described below.

The synthesizer 203 has a function of synthesizing an input image received from the input control unit 202 and an image stored in the buffer 204 with each other. Here, synthesizing refers to layering images on each other in a predetermined order.

The buffer 204 is a buffer that corresponds to the size of the output image generated as a result of synthesis by the synthesizer 203. The size of the buffer 204 is 320 pixels×240 pixels, which is equivalent to the screen size of the display unit 101. Since the buffer 204 is capable of storing only one image corresponding to the screen size of the display unit 101, synthesized images synthesized by the synthesizer 203 are stored in the buffer 204 by successive overwriting.

The output control unit 205 has a function of reading an output image that has been synthesized by the synthesizer 203 and stored in the buffer 204, and transmitting the read output image to the memory 104.

3. Operations of the Image Synthesis Unit 200

The following describes operations for image synthesis processing by the image synthesis unit 200.

When generating a first image and a second image by synthesizing a plurality of input images including input images common to the first image and the second image, the image synthesis unit 200 temporarily stores the generated first image in the buffer 204, and then generates the second image using the stored first image.

The following describes operations in a case in which a first image is generated from two input images (1) and (2), and a second image is generated from four input images (1) to (4), two of which are common to the first image and the second image.

Figure 5:
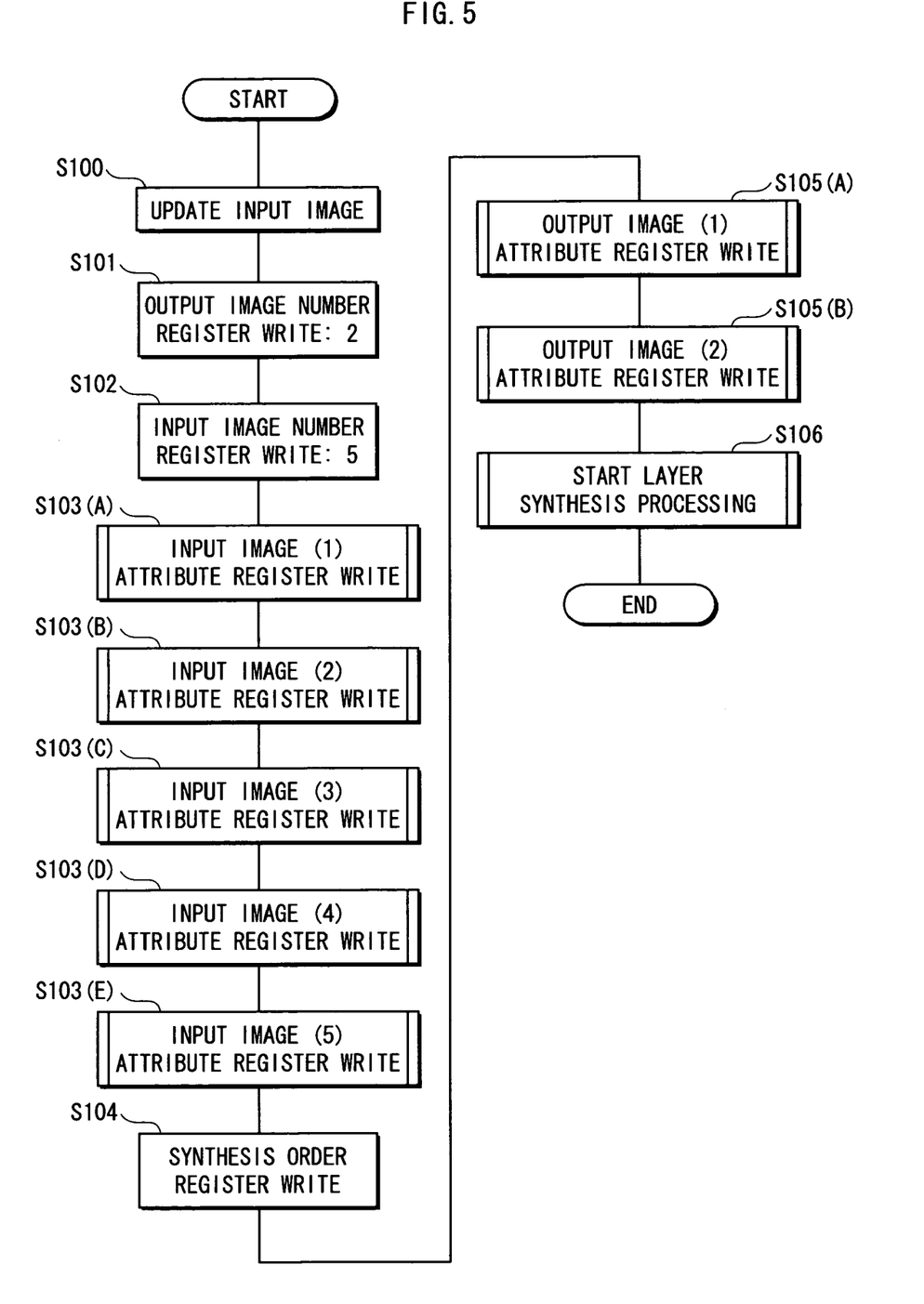
FIG. 5 is a flowchart showing a procedure for making settings for image synthesis in the image synthesis unit 200.
Figure 6:
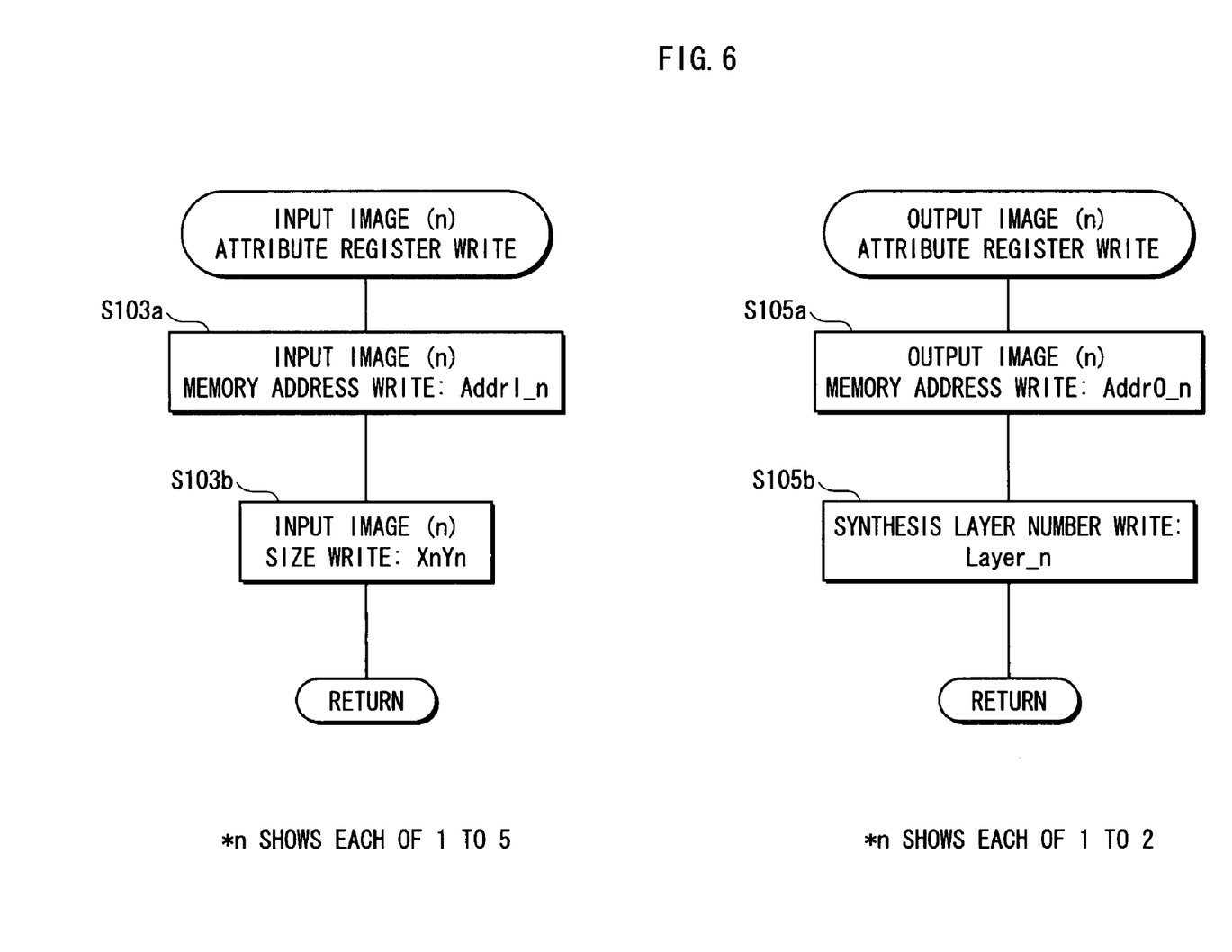
FIG. 6 is a flowchart showing a procedure for making settings for image synthesis in the image synthesis unit 200.

FIGS. 5 and 6 are flowcharts showing the procedure for making settings for performing image synthesis in the image synthesis unit 200.

Figure 7:
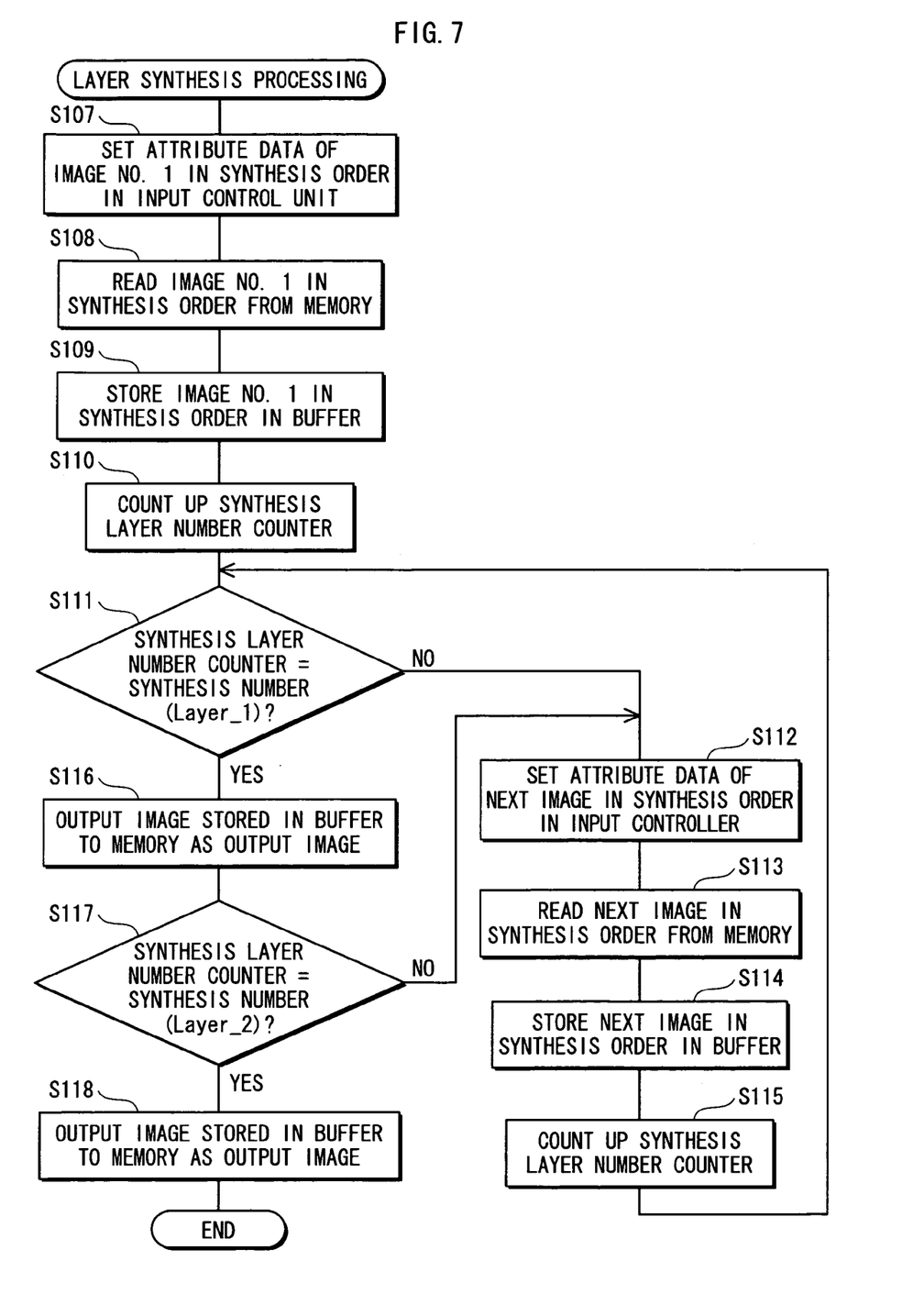
FIG. 7 is a flowchart showing operations of the image synthesis unit 200.

FIG. 7 is a flowchart showing image synthesis performed by the image synthesis unit 200.

As shown in FIG. 5, first the CPU 105 operates in accordance with a program for updating an input image, and updates an input image in the memory 104 (step S100). As one example, if an image is taken by the camera 103, the input image is updated in accordance with the timing with which the camera 103 takes the image.

Next, the CPU 105 operates in accordance with a program for writing to a register, and writes the output image number to the output image number register 201c (step S101).

In accordance with the program for writing to the register, the CPU 105 writes the input image number to the input image number register 201a (step S102).

In accordance with the program for writing to the register, the CPU 105 writes the respective attributes of the input image (1), the input image (2), the input image (3), the input image (4), and the input image (5) to the input image attribute register 201b (steps S103(A) to (E)). More specifically, as shown in FIG. 6, the CPU 105 writes the input images (1) to (5) to respective addresses (AddrI_n, n being (1) to (5)) in the memory 104 (step S103(A)) and the respective image sizes (XnYn, n being (1) to (5)) (step S103(B)).

In accordance with the program for writing to the register, the CPU 105 then writes the synthesis order for when the input images (1) to (5) are layer synthesized to the synthesis order register 201e (step S104).

Furthermore, operating in accordance with the program for writing to the register, the CPU 105 writes the respective attributes of the output image (1) (first image) and the output image (2) (second image) to the output image attribute register 201d (steps S105(A) to (B)). More specifically, as shown in FIG. 6, the CPU 105 writes the output images (1) and (2) to addresses (AddrO_n, n being (1) and (2)) for storing the images (1) and (2) (step S105(A)), and writes the synthesis number (Layer_n, n being (1) and (2)) necessary for generating each output image to the output image attribute register 201d (step S105(B)).

This completes the input image and output image settings, and the image synthesis unit 200 starts layer synthesis processing (S106).

As shown in FIG. 7, first the layer synthesis control unit 201 transmits attribute data of the input image that is No. 1 in the synthesis order (the image that is the backmost layer) to the input control unit 202 (step S107). Specifically, the layer synthesis control unit 201 transmits the address AddrI_1 in the memory 104 and the image size of the input image (1).

Next, the input control unit 202 reads the input image (1), which is No. 1 in the synthesis order, from AddrI_1 in the memory 104 (step S108).

Next, the synthesizer 203 is to synthesize the input image (1) and the image in the buffer 204. However, since no image is stored in the buffer 204 as yet, the input image (1) is stored in the buffer 204 without being synthesized (step S109).

Here, the synthesis number counter 201f counts up by one (adds "1") (step S110).

With the synthesis number counter 201f having counted up, the comparator 201g compares the total count of the synthesis number counter 201f with the synthesis number (Layer_1) necessary to generate the output image (1) (first image) whose attributes are stored in the output image attribute register 201d (step S111).

If the total count of the synthesis number counter 201f and the synthesis number (Layer_1) necessary to generate the output image (1) do not match (step S111: NO), this means that the first image is still in the process of being generated, and the synthesizer 203 synthesizes subsequent images according to the synthesis order, starting from the next image in the synthesis order. Specifically, the layer synthesis control unit 201 sends the attributes of the input image (2) to the input control unit 202 (step S112), and the input control unit 202 reads the input image (2) from the address (AddrI_2) in the memory 104 (step S113). The synthesizer 203 then synthesizes the input image (2) and the input image (1) stored in the buffer 204, and stores the generated image in the buffer 204 (step S114).

The synthesis number counter 201f counts up by 1 (step S115).

Next, the processing returns to step S111 where the comparator 201g compares the total count of the synthesis number counter 201f with the synthesis number (Layer_1) necessary to generate the output image (1) (first image) whose attributes are stored in the output image attribute register 201d, and while the two do not match, successively synthesizes the next input images in the synthesis order (steps S112 to S115).

On the other hand, when the comparison by the comparator 201g shows that the total number of the synthesis number counter 201f and the synthesis number (Layer_1) match (step S111: YES), this means that the first image has been generated and is being stored in the buffer 204, and therefore, the output control unit 205 outputs the first image stored in the buffer 204 to AddrO_1 in the memory 104 (step S116).

After the first image has been output, the comparator 201g further compares the total count of the synthesis number counter 201f and the synthesis number (Layer_2) stored in the output image count register 201d, and when the two do not match (step S117: NO), this means that there is still the output image (2) to be generated, and therefore, at steps S112 to S115 an input image is read in accordance with the synthesis order from the memory 104, and the read input image is synthesized with the first image stored in the buffer 204.

On the other hand, when the two match at step S117, this means that the second image has been generated and is being stored in the buffer 204, and therefore the output control unit 205 outputs the second image stored in the buffer 204 to AddrO_2 in the memory 104 (step S118).

4. Specific Example

The following uses output images (1) and (2) displayed by the display unit 101 to give a specific example of image synthesis processing operations in the image synthesis unit 200.

Figure 8:
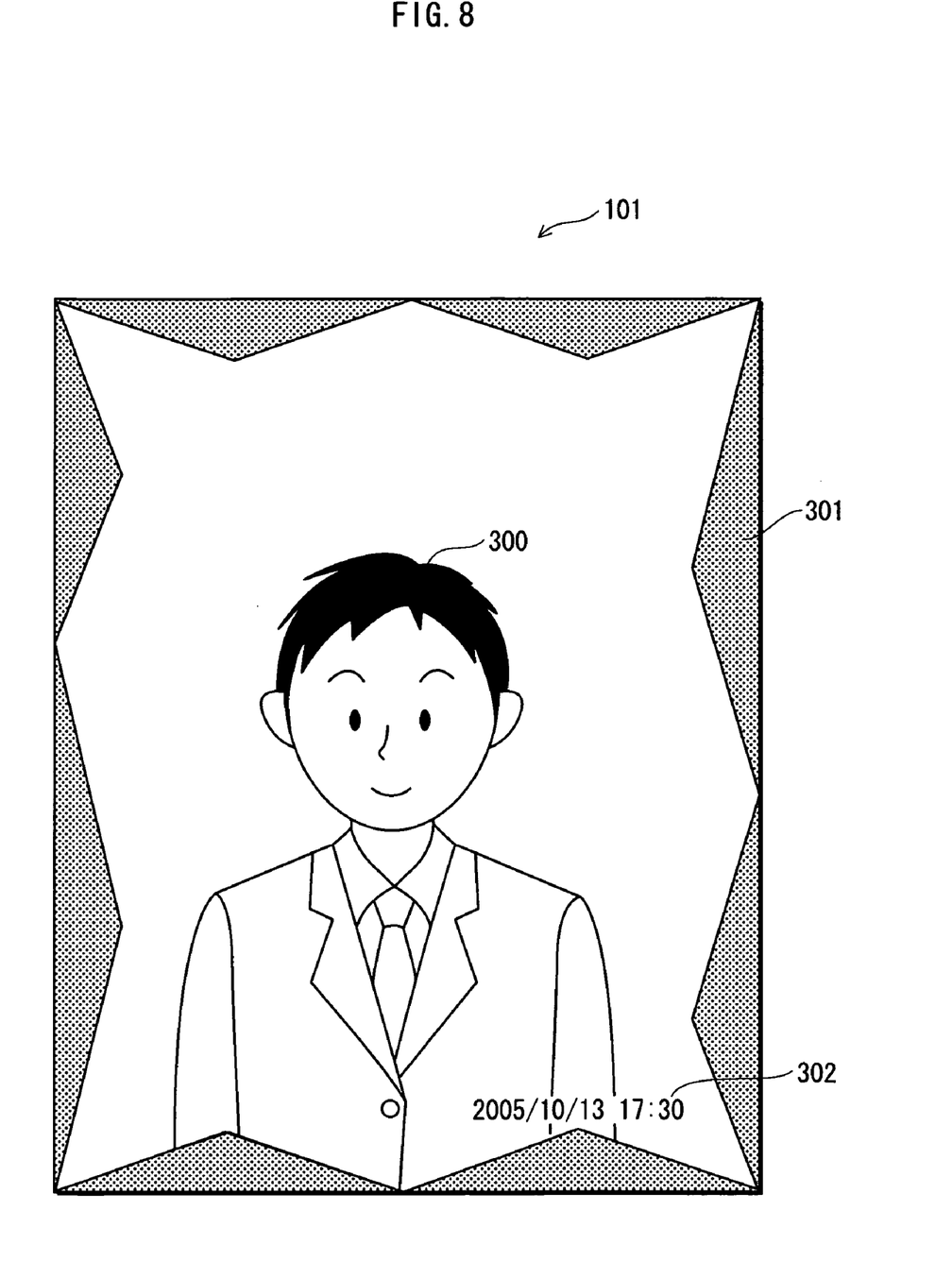
FIG. 8 is a schematic drawing showing a first image displayed by the PDA 100.

FIG. 8 is a schematic drawing showing the first image displayed on the PDA 100.

Figure 9:
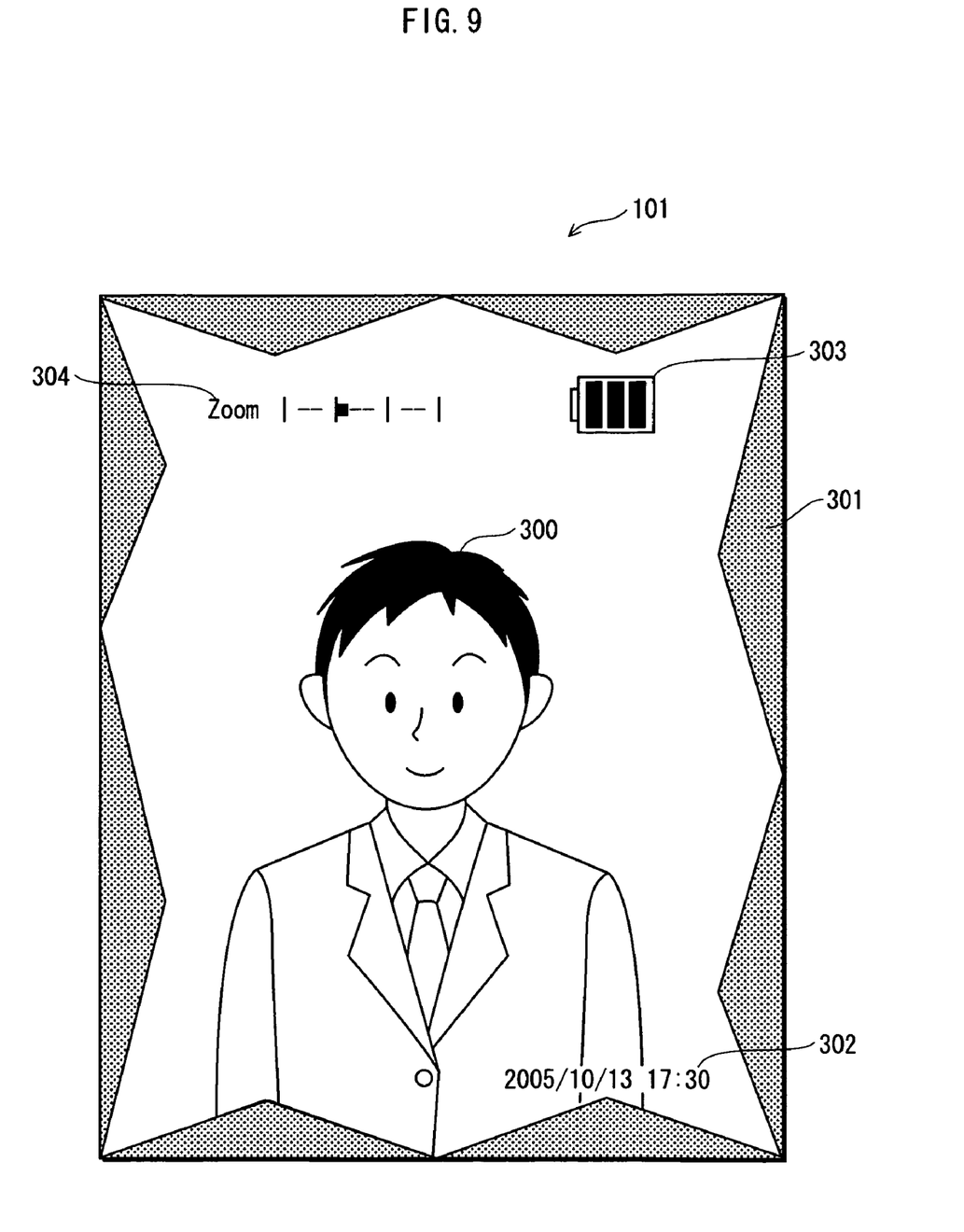
FIG. 9 is a schematic drawing showing a second image displayed by the PDA 100.

FIG. 9 is a schematic drawing showing the second image displayed on the PDA 100.

Figure 10:
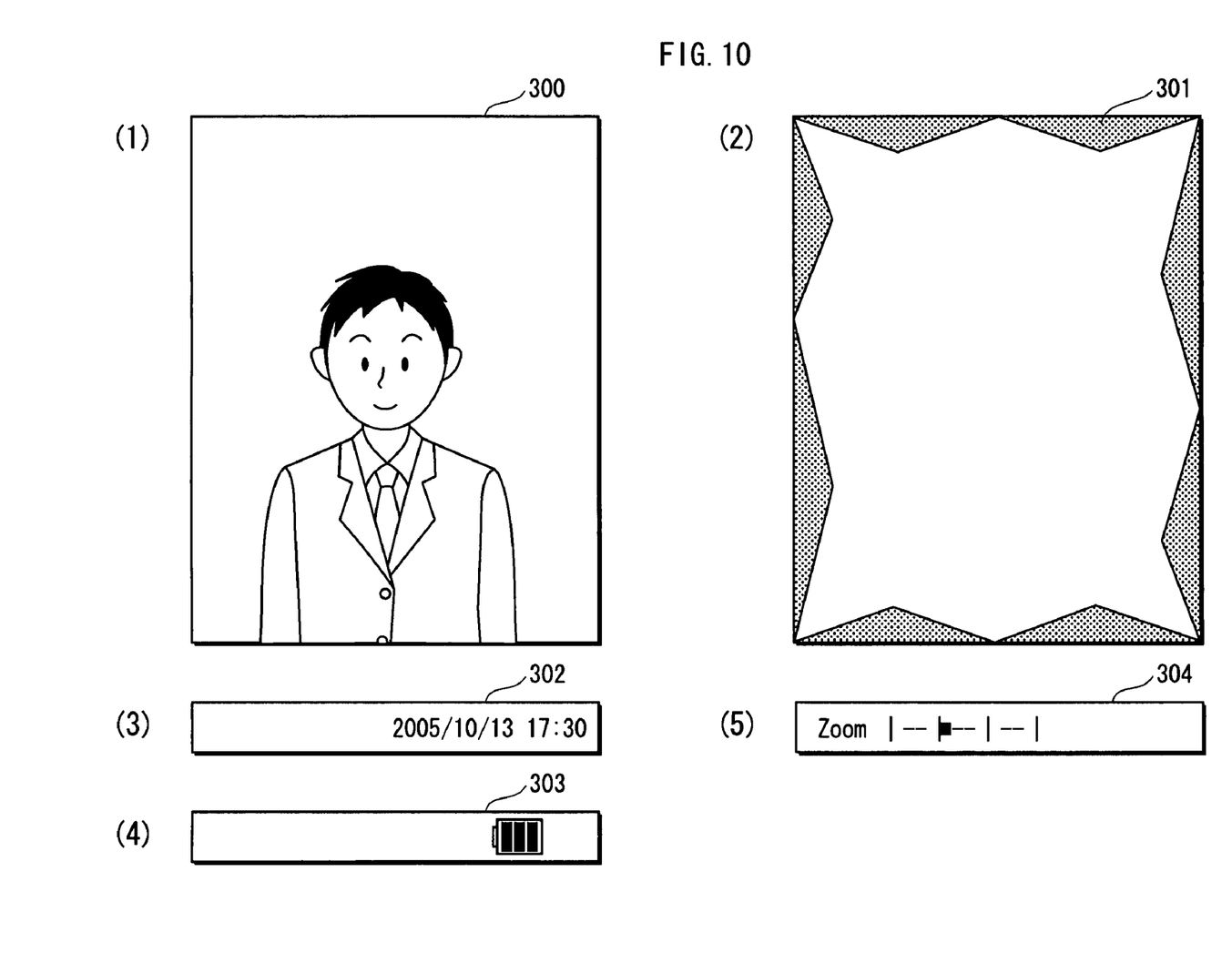
FIG. 10 is a schematic drawing showing images that compose the first image and the second image.

FIG. 10 is a schematic drawing showing input images that compose the first image and the second image.

Figure 11:
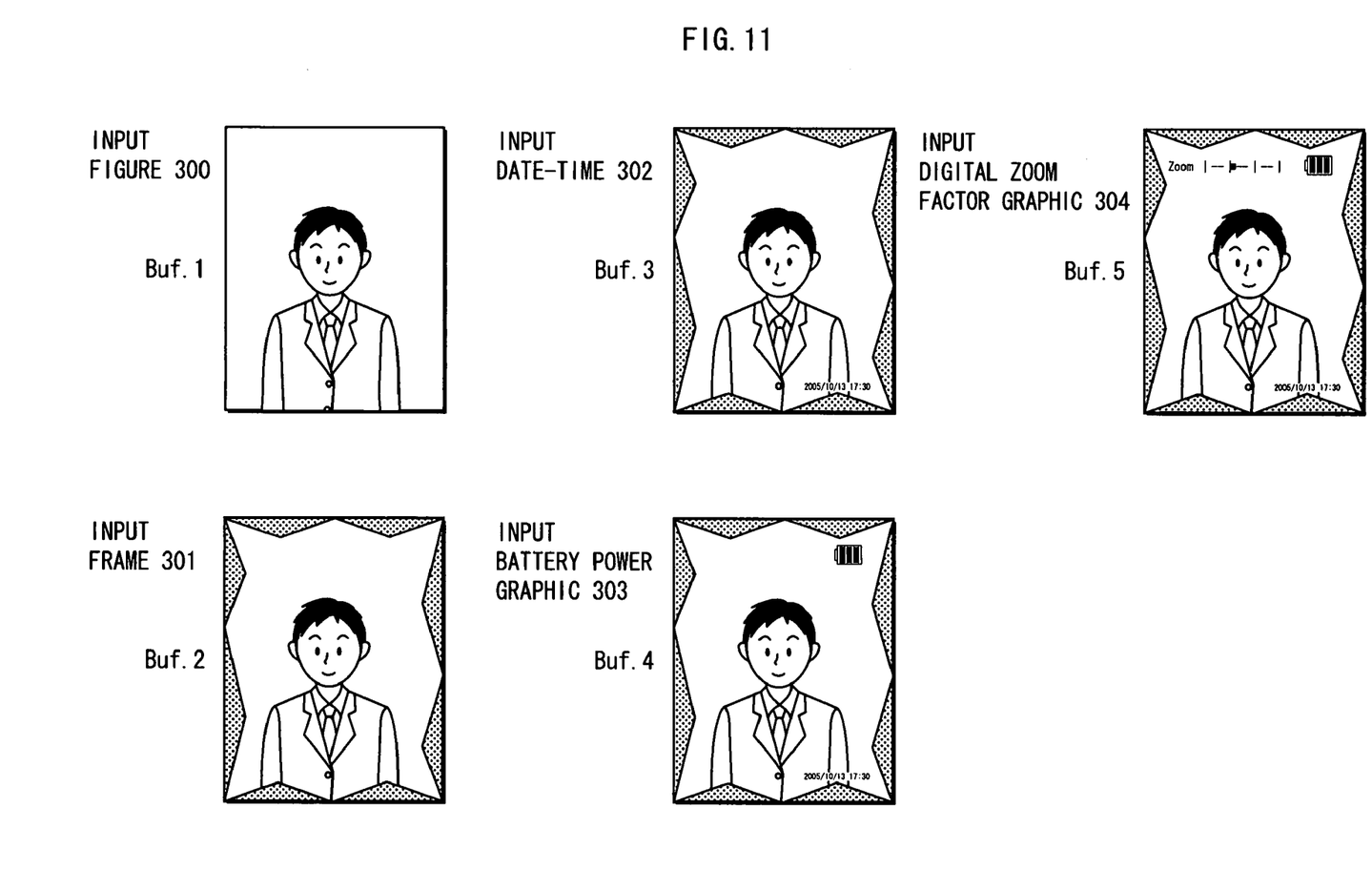
FIG. 11 is a schematic drawing showing transition of images stored in a buffer 204.

FIG. 11 is a schematic drawing showing transition of the image stored in the buffer 204 during image synthesis processing.

In the present example, when the camera 103 is activated and captures a figure 300 of a person who is the subject, the figure 300 is synthesized with a frame 301 set by the user in advance and the date-time 302 when the image was taken. The image obtained by synthesizing these three images is the first image. Here, the figure 300, which is the backmost layer, is the input image (1), the frame 301 is the input image (2), and the time-date 302 is the input image (3).

On the other hand, while the camera 103 is being activated in order to take the figure 300, an image, which is the second image, is displayed on the display unit 101. The second image is generated by further synthesizing two images, specifically a battery power graphic 303 and a digital zoom factor graphic 304, in addition to the first image composed of the figure 300, the frame 301 and the date-time 302. Note that the battery power graphic 303 shows how much power remains in a battery (not illustrated) that drives the PDA 100, and the digital zoom factor graphic 304 shows the zoom factor of the digital zoom of the camera 103. Here, the battery power graphic 303 is the input image (4) and the digital zoom factor graphic is the input image (5).

When the figure 300, the frame 301, the date-time 302, the battery power graphic 303, and the digital zoom factor graphic 304 are synthesized to generate the first image and the second image in this way, the process flow shown in FIGS. 5 to 7 transitions as follows.

At step S100, the figure 300 is updated in accordance with the timing with which the camera 103 captures the image, the date-time 302 is updated every minute, the battery power graphic 303 is updated as the scale changes, and the digital zoom factor graphic 304 is updated as the zoom factor changes.

At step S101, "2" is written to the output image count register 201c as the output image count.

At step S102, "5" is written to the input image count register 201a as the input image count.

At steps S103 (A) to (E), the respective attributes of the figure 300, the frame 301, the date-time 302, the battery power graphic 303, and the digital zoom factor graphic 304 are written to the input image attribute register 201b.

At step S104, in accordance with the synthesis order, the input images are written to the register 201e, starting from the figure 300 that is No. 1 in the synthesis order and is written to the address AddrI_1, through to the digital zoom factor graphic 304 that is No. 5 in the synthesis order and is written to the address AddrI_5.

At step S105, the attributes of the output images (1) and (2) are written to the output image attribute register 201d. The synthesis count (Layer_1) necessary to generate the output image (1) is "3", and the synthesis count (Layer_2) necessary to generate the output image (2) is "5".

This completes the input image and output image settings, and the image synthesis unit 200 starts layer synthesis processing.

At step S107, the attribute data of the figure 300 is sent to the input control unit 202, and at step S108 the figure 300 is read.

At step S109, the figure 300 is stored in the buffer 204 without being synthesized. As a result, the buffer 204 transitions to a state of Buf. 1 shown in FIG. 11.

At step S110, the synthesis number counter 201f adds "1", bringing the total count to "1".

At step S111, the comparator 201g compares the total count "1" of the synthesis number counter 201f and "3" of Layer_1, and when the two do not match at step S112, the attributes of the frame 301, which is No. 2 in the synthesis order, are sent to the input control unit 202.

At steps S113 to S114, the frame 301 read from AddrI_2 in the memory 104 and the figure 300 stored in the buffer 204 are synthesized by the synthesizer 203, and the resultant synthesized image is newly stored in the buffer 204. As a result, the buffer 204 transitions to the state of Buf. 2 shown in FIG. 11.

The total count subsequently becomes "2" at step S115.

According to the comparison at step S111 the second time, the total count "2" of the synthesis number counter 201f and "3" of Layer_1 still do not match, and therefore once again at steps S112 to S115, the date-time 302 that is No. 3 in the synthesis order is read from AddrI_3 in the memory 104, and synthesized with the image (Buf. 2) in the buffer 204, thereby overwriting the buffer 204. As a result, the buffer 204 transitions to the state of Buf. 3 shown in FIG. 11.

When the buffer 204 is in the state of Buf. 3, the total count of the synthesis number counter 201f becomes "3", and since, as a result of the comparison at step S111 the third time, the total count matches "3" of Layer_1, the image in the state of Buf. 3 is the first image. As a result, at step S116, the synthesized image stored by the buffer 204 in the state of Buf. 3 is output by the output control unit 205 to AddrO_1 in the memory 104.

When output of the first image is complete, since, as a result of the comparison at step S117, the total count "3" of the synthesis number counter 201f and "5" of Layer_2 do not match, at steps S112 to S115, the battery power graphic 303 that is No. 4 in the synthesis order is synthesized with the image (Buf. 3) in the buffer 204, thereby overwriting the buffer 204, and the synthesis number counter 201f counts up. As a result, the buffer 204 transitions to the state of Buf. 4 shown in FIG. 11.

In the comparison at step S117 the second time, since the total count "4" of the synthesis number counter 201f and "5" of Layer_2 still do not match, at steps S112 to S115, the digital zoom factor graphic 304 that is No. 5 in the synthesis order is synthesized with the image (Buf. 4) in the buffer 204, thereby overwriting the buffer 204, and the synthesis number counter 201f counts up. As a result, the buffer 204 transitions to the state of Buf. 5 shown in FIG. 11.

When the buffer 204 is in the state of Buf. 5, the total count of the synthesis number counter 201f becomes "5", and since, as a result of the comparison at step S117 the third time, the total count matches "5" of Layer_2, the image in the state Buf. 3 is the second image. As a result, at step S118, the synthesized image stored by the buffer 204 in the state of Buf. 5 is output by the output control unit 205 to AddrO_2 in the memory 104.

As has been described, according to the image synthesis unit 200, when generating a first image and a second image by synthesizing a plurality of input graphics, the number of memory accesses and the number of duplicated synthesis processes when generating the second image can be reduced because the generated first image is temporarily stored in the buffer 204, and the stored first image is used to generate the second image. This lightens the load on the image synthesis apparatus.

For instance, as illustrated by the above example, when generating a first image by synthesizing three images, and a second image by synthesizing five images, the first image generated by synthesizing three images is temporarily stored in the buffer, and the second image is generated by synthesizing the stored first image with the remaining two images. This reduces the number of memory accesses and the number of duplicated synthesis processes when generating the second image.

Modifications

The present invention has been described based on the above first embodiment, but is by no means limited thereto. The following describes an example of a modification.

Figure 12:
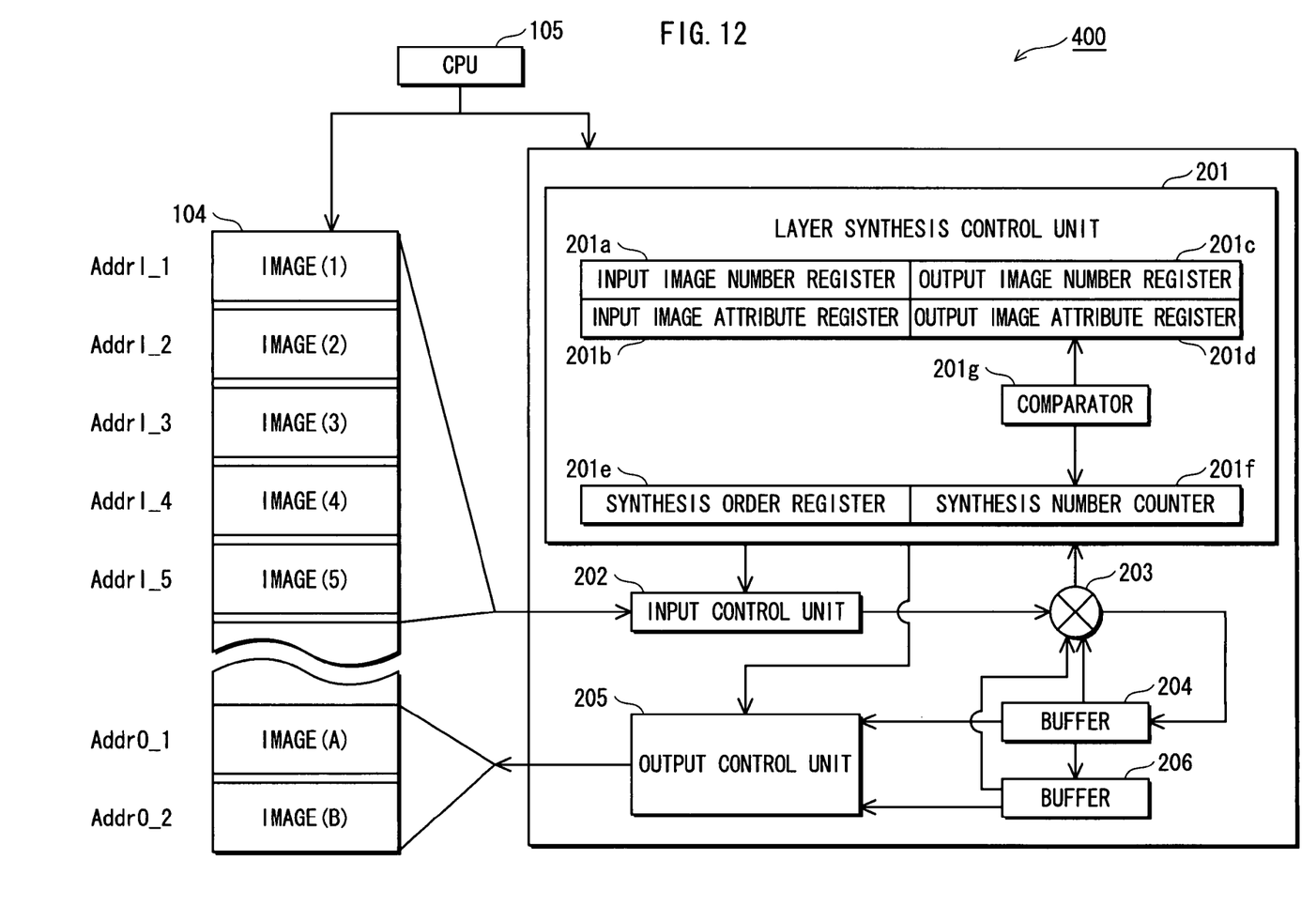
FIG. 12 is a function block diagram showing the structure of a modification example 400 of the image synthesis unit 200.

FIG. 12 is a block diagram showing the structure of a modification example 400 of the image synthesis unit 200 described in the first embodiment.

As shown in FIG. 12, the modification example 400 differs from the first embodiment in that, in addition to the structure of the image synthesis unit 200, it includes one more buffer 206, and after first copying the first image, which is stored in the buffer 204, to the buffer 206, the second image is then generated using the first image stored in the buffer 204.

With this structure, the first image is read to AddrO_1 in the memory 104, and the second image is generated using the first image stored in the buffer 204 and output to AddrO_2. Then, when yet another output image (third image) is to be generated, if the third image has input images in common with the first image, the first image stored in the buffer 206 can be used to generate the third image. If the third image has input images in common with the second image, the second image stored in the buffer 204 can be used to generate the third image.

For instance, supposing that a third image is to be generated after the previously-described specific example, if the third image is composed of input images (1)+(2)+(3)+(α), the first image stored in the buffer 206 can be used. Alternatively, if the third image is composed of input images (1)+(2)+(3)+(4)+(5)+(α), the second image stored in the buffer 204 can be used. Note that although not illustrated, (α) is another image that comes after (1) to (5) in the synthesis order.

In this way, the third image can be generated by selectively using the first image stored in the buffer 206 and the second image stored in the buffer 204, depending on whether the image having input images in common with the third image is the first image or the second image. Therefore, the number of memory accesses and the number of duplicated synthesis processes can be reduced also when the third image is to be generated based on either of the first image and the second image.

5. Supplementary Remarks (1) The image synthesis unit 200 of the present invention is described as being included in the PDA 100 in the first embodiment, but is not limited to being so. The image synthesis unit 200 may be applied to various types of information devices such as a digital camera specialized for a photography function, or a PC (personal computer).

(2) The size of the screen of the display unit 101 of the PDA 100 is not limited to being the 320 pixels×240 pixels described in the first embodiment. The number of pixels is determined appropriately according to the size of the display unit 201.

(3) The image synthesis apparatus named in the first embodiment can be referred to also as an image overlay apparatus in accordance with the corresponding technical term.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image synthesis apparatus for synthesizing a plurality of input images with each other to generate a first output image and a second output image, the image synthesis apparatus comprising:
   a synthesis order storage unit storing a synthesis order designating an order in which the input images are to be synthesized;
   a synthesis number storage unit storing a first synthesis number and a second synthesis number, the first synthesis number designating how many of the input images are to be synthesized to generate the first output image and the second synthesis number designating how many of the input images are to be synthesized to generate the second output image;
   an image obtaining unit obtaining the plurality of input images;
   a buffer storing a synthesized image that results from synthesis;
   a synthesizer successively performing processing to, in accordance with the synthesis order, synthesize an input image from among the obtained plurality of input images with the synthesized image stored by the buffer, thereby newly obtaining a synthesized image, and store the newly obtained synthesized image in the buffer;
   a counter that is connected to the synthesizer, the counter having an initial value of zero and counting up each time the buffer newly stores a synthesized image; and
   an output control unit controlling output of the synthesized image stored in the buffer, such that (a) when a value shown by the counter matches the first synthesis number, the first output image, which is the synthesized image stored in the buffer, is output to the external destination, and (b) when the value shown by the counter matches the second synthesis number, the second output image, which is the synthesized image stored in the buffer, is output to the external destination.

2. The image synthesis apparatus of claim 1, wherein
   each of the input images is stored in a different one of memory areas in an external memory, each memory area being designated by a respective address,
   the image obtaining unit obtains each input image from the memory area designated by the respective address, and
   the output control unit controls such that the first output image is output to, in the external memory, a memory area designated by a first predetermined address, and the second output image is output to, in the external memory, a memory area designated by a second predetermined address.

3. The image synthesis apparatus of claim 1, wherein
   the buffer has a capacity that is equivalent to a size of the synthesized image generated by the synthesizer.

4. The image synthesis apparatus of claim 1, further comprising a secondary buffer that is equal in capacity to the buffer,
   wherein, when controlling such that the first output image is output, the output control unit further copies the first output image to the secondary buffer, and
   the synthesizer performs further synthesis with use of one of (a) the second output image stored in the buffer and (b) the first output image stored in the secondary buffer.

5. An image synthesis method used in an image synthesis apparatus for synthesizing a plurality of input images with each other to generate a first output image and a second output image,
   the image synthesis apparatus including: a buffer storing a synthesized image that results from synthesis; and a counter,
   the image synthesis method comprising the steps of:
   a synthesis order storage step of storing a synthesis order designating an order in which the input images are to be synthesized;
   a synthesis number storage step of storing a first synthesis number and a second synthesis number, the first synthesis number designating how many of the input images are to be synthesized to generate the first output image and the second synthesis number designating how many of the input images are to be synthesized to generate the second output image;
   an image obtaining step of obtaining the plurality of input images;
   a synthesizing step of successively performing processing to, in accordance with the synthesis order, synthesize an input image from among the obtained plurality of input images with the synthesized image stored by the buffer, thereby newly obtaining a synthesized image, and store the newly obtained synthesized image in the buffer;
   a counting step for having the counter count up each time the buffer newly stores a synthesized image, an initial value of the counter being zero; and
   an output control step of controlling output of the synthesized image stored in the buffering step, such that (a) when a value shown by the counter matches the first synthesis number, the first output image, which is a synthesized image stored in the buffer, is output to an external destination, and (b) when the value shown by the counter matches the second synthesis number, the second output image, which is a synthesized image stored in the buffer, is output to the external destination.

* * * * *